(12) United States Patent
Stecher

(10) Patent No.: US 7,794,823 B2
(45) Date of Patent: Sep. 14, 2010

(54) ARTICLE WITH ANTI-ADHESION COATING AND METHOD FOR PRODUCTION

(75) Inventor: Christoph Stecher, Wilhelmshaven (DE)

(73) Assignee: STE Gesellschaft fur Dichtungstechnik mbH, Wilhelmshaven (DE)

( * ) Notice: Subject to any disclaimer, the term of this patent is extended or adjusted under 35 U.S.C. 154(b) by 53 days.

(21) Appl. No.: 11/815,173

(22) PCT Filed: Feb. 2, 2006

(86) PCT No.: PCT/DE2006/000158

§ 371 (c)(1),
(2), (4) Date: Apr. 18, 2008

(87) PCT Pub. No.: WO2006/081801

PCT Pub. Date: Aug. 10, 2006

(65) Prior Publication Data

US 2008/0311382 A1    Dec. 18, 2008

(30) Foreign Application Priority Data

Feb. 2, 2005    (DE) .................. 10 2005 004 829

(51) Int. Cl.
*B32B 27/00* (2006.01)
*B32B 5/16* (2006.01)

(52) U.S. Cl. .................. 428/212; 428/220; 428/325; 428/323; 428/331; 428/339; 427/299; 427/314; 427/375; 427/470

(58) Field of Classification Search ........... 428/212, 428/220, 325, 323, 331, 339; 427/299, 314, 427/375, 470

See application file for complete search history.

(56) References Cited

U.S. PATENT DOCUMENTS

| 5,536,583 | A | 7/1996 | Roberts et al. |
| 6,382,454 | B1 | 5/2002 | Buffard et al. |
| 6,596,380 | B1 | 7/2003 | Buffard et al. |
| 7,144,622 | B1 | 12/2006 | Stecher et al. |
| 2001/0044019 | A1 * | 11/2001 | Huesmann .................. 428/325 |

FOREIGN PATENT DOCUMENTS

| DE | 199 41 410 | 3/2001 |
| DE | 600 07 853 | 12/2004 |
| DE | 600 07 855 | 12/2004 |
| EP | 0 894 541 | 11/2000 |
| EP | 11 69 142 | 1/2002 |
| WO | WO00/54896 | 9/2000 |
| WO | WO 01/16240 | 3/2001 |
| WO | WO02/14065 | 2/2002 |
| WO | WO2004/024348 | 3/2004 |
| WO | WO 2004/108842 | 12/2004 |

OTHER PUBLICATIONS

English translation of International Preliminary Report for PCT/DE2006/000158, Aug. 2007.
Römpp Online—ID=RD-06-01447, "Fluorpolymere", (English Translation), 4 pages, Jul. 2007.
Statement of Appeal, corresponding DE 10 2005 004 829 B4 dated Dec. 17, 2008, 17pages.
International Search Report for PCT/DE2006/000158, Apr. 2006.
Written Opinion for PCT/DE2006/000158, Mar. 2004.

* cited by examiner

*Primary Examiner*—David R Sample
*Assistant Examiner*—Lawrence D Ferguson
(74) *Attorney, Agent, or Firm*—Fish & Richardson P.C.

(57) ABSTRACT

An article with a coating on its surface is described herein. The coating has at least one underlayer and a top layer. The underlayer includes one or more high-performance thermoplastics and inorganic tillers and the top layer includes one or more high-performance thermoplastics.

17 Claims, 3 Drawing Sheets

ARTICLE WITH ANTI-ADHESION COATING AND METHOD FOR PRODUCTION

TECHNICAL FIELD

This patent application relates to an article with an antistick coating with improved mechanical strength and is more capable of resisting damage and wear.

BACKGROUND

Antistick coatings have a large number of uses on surfaces that are to be kept free of contaminants. For example, it is well known that cook wares used in the kitchen like pans with antistick coatings contain a high level of fluorine-containing polymers such as Teflon pans. Antistick coatings of fluorine-containing polymers have low forces of adhesion to most materials, so it results in poor adhesion of the antistick coating to the surface that is to be coated. In addition, antistick coatings are soft in particular at higher temperatures and therefore are mechanically sensitive. It easily leads to damage and separation of the antistick coating and thus reduces the lifetime of the antistick coating.

U.S. Pat. No. 6,596,380 B1 describes an improved antistick coating to improve the adhesion of the antistick coating to the substrate. It is proposed to use a three-layer structure that has an underlayer, a primary layer and a top layer, where the underlayer comprises at least 50% by weight polyether ether ketone (PEEK) and the top layer essentially comprises fluorine-containing polymers. In addition to temperature-stable polymers the main layer also contains fluorine-containing polymers.

DE 600 07 853 T2 describes an antistick coating with an underlayer, a primary layer containing a fluorocarbon and at least one top layer based on a fluorine plastic in which the scratch resistance is improved through the use of an underlayer essentially comprises polyether ether ketone.

However, such a coating still has relatively low hardness and in particular at high temperatures, for example, in cookware or pans shows poor hardness at high temperature, and therefore improvable adhesion to the base is needed.

SUMMARY

Described herein is an article with an antistick coating that, besides having good adhesion, includes a surface with improved hardness and is more durable.

The coating is made of at least two layers, an underlayer and a top layer as the uppermost layer. The underlayer is improved with regard to adhesion and temperature resistance, while the top layer provides the desired antistick properties, but is improved in its hardness in comparison with the known antistick coatings.

Surprisingly, it was found that, in contrast to the known antistick coatings, a corresponding nonstick surface property can already be achieved in the top layer with a content of thermoplastic fluoropolymers of 20-30% by weight. Besides the fluoropolymers, the top layer contains one or more high-performance thermoplastics, which improve the thermostability and the hardness of the top layer. Inorganic fillers can also be contained in a small amount, for example, 10% by weight. The thickness of the top layer can be, for example, 5-30 μm.

The underlayer comprises one or more high-performance thermoplastics and can also be filled with inorganic fillers. Due to the high-performance thermoplastics, the adhesion to the surface of the article is improved. The thermal stability as well as the hardness of the underlayer are improved at the same time. The thermoplastic components of the underlayer and top layer, which may correspond to at least one component, guarantee that an essentially stable bond between the layers is obtained with good adhesion to the surface of the article, which can be achieved after producing an article by melting. The thickness of the underlayer is at least 5 μm.

Good adhesion to the article is ensured for a large number of surface materials, in particular for iron, steel, light metals and nonferrous metals, glass, ceramics and plastic surfaces.

The high-performance thermoplastics in the underlayer and top layer can be chosen from liquid crystalline polymers (LCP), polyaryl ether ketones, polyether ketone (PEK), polyether ether ketone and mixtures of the last two high-performance thermoplastics. The best results with regard to hardness and adhesion may be achieved with these materials. In addition, coatings that are improved over the prior art with regard to strength and abrasion can also be obtained with polyphenylene sulfide (PPS).

In one embodiment, the underlayer contains the thermoplastic components with only PEK or PEK/PEEK mixtures with a content of less than 50% PEEK with respect to the total composition of the underlayer.

Compared to an article known from the prior art and provided with an antistick coating, the proposed article has a simpler structure with more favorable properties. It is also surprising that PEEK or even PPS, especially in mixtures, which have a cost advantage over the PEK polymers, can also be used with good result in the underlayer, which is closer to the surface of the article.

Besides the high-performance thermoplastics, the underlayer can also contain inorganic fillers, through which a number of properties of the underlayer and thus the overall coating can be adjusted. For example, it is possible to provide metallic particles in the underlayer. Without the adhesion of the overall coating it is improved in particular to metallic surfaces.

If metallic particles are used as inorganic fillers, degrees of filling up to about 90% can be achieved, with respect to parts by weight. Metallic particles may be chosen from non-noble metals, which have the advantage that those can be coated with a passivating layer in a simple way, so that excellent electrical insulation of the filled layer can be assured with the metallic particles. An improvement of the adhesion of the underlayer to the surface of the article may be achieved with the metallic particles.

If good electrical insulation of the coating is desired, an adhesion layer filled with metallic particles can be provided under the underlayer. The underlayer is then free of metallic particles and has a thickness that is sufficient or suitable to produce the desired dielectric strength. For an underlayer that is free of metallic particles and is only filled with dielectric inorganic fillers, a dielectric strength of ten kV can already be achieved with a thickness of about 100 μm.

The adhesion layer can additionally contain the polymer that may be chosen from the family of the polyaryl ether ketones PAEK, PEK, PEEK and mixtures thereof, where the said polymer can make up an amount by weight from 80-100% in the adhesion layer. The amount needed to make up 100% is then filled with suitable inorganic fillers.

In addition, it is possible to use the said and other inorganic fillers in any modification. For example, mineral fillers in amorphous or polycrystalline form as well as crystalline and polycrystalline fiber substances are possible. Ceramic nano-particles, fibers and lamellar particles may also be suitable. Glass fibers, carbon fibers, diamond, carbon black and graphite as well as natural minerals such as barium sulfate or, for example, even minerals in lamellar modifications such as mica may also be suitable. Further suitable may be silicates, quartz, silica, glass and other materials and ceramic particles or zeolite.

The thermal conductivity of the coating, for example, can be adjusted via the inorganic fillers. A good thermal conductivity may be achieved, for example, with metallic fillers.

However, essentially the fillers are chosen so that the hardness of the underlayer and the overall coating will be increased. Other properties that can be improved with the inorganic fillers may be the electrical insulation, or the dielectric constant and the chemical stability, thus the resistance to especially aggressive chemicals.

In another embodiment, at least one additional intermediate layer is provided between the underlayer and top layer, with which an additional property can be introduced into the coating. For example, it is possible to provide the intermediate layer with especially high hardness via a suitable filler. It is also possible to achieve a good damping of vibrations and in particular good sound damping, for example, via a high mass in the coating. While the underlayer can provide good adhesion to the surface of the article and electrical insulation, the intermediate layer can independently be optimized for a different purpose.

For the composition of such an intermediate layer, as for the underlayer, the fillers can be contained up to a maximum degree of filling by volume, which can amount to about 80%, for example. An optimum degree of filling, however, can be lower than that and can, for example, be up to about 50%. The rest of the layer can chiefly comprise the said high-performance plastics, for example, more than 50%. In the thermoplastic plastic composition more than 80% or more than 90% or even 100% by weight fraction of the said high-performance thermoplastics, and in particular the said polyaryl ether ketones, PEK, PEEK and LCP or mixtures thereof, are also possible. The rest of the intermediate layer can comprise other temperature-stable thermoplastics. Moreover, the intermediate layer can also contain the substantially known auxiliary substances and additives that are conventional for thermoplastics. The thickness of the intermediate layer can in each case according to the desired properties be up to about 500 μm. However, greater thicknesses may also be possible.

An underlayer thickness of about 5-10 μm may be already sufficient for the desired overall function of the coating. If the coating is used, for example, in a cookware article or pan, an underlayer thickness of about 10-30 μm, for a qualitatively much improved coating of 40 μm, may be sufficient. The adhesion and the durability of the overall coating is improved over the prior art with such underlayers. For example, it is clearly improved over a known coating with an underlayer of plastic-sprayed ceramic.

Overall, the chosen thickness of the underlayer is dependent on the desired quality of the overall coating. A greater thickness may also improve the desired property that is incorporated with the layer, especially the chemical stability and electrical insulation. On the other hand, an unnecessarily great thickness of course increases the cost of the coating, so a minimal layer thickness sufficient for the desired quality of the coating is aimed for.

On the other hand, starting with a thickness of about 10-30 μm, the top layer satisfies the desired antistick effect that makes the coating suitable in particular for use in cookware. Increases in the thickness of the top layer for the most part may only bring small improvements with regard to the properties of the layer, so greater thicknesses may not be necessary. A greater thickness can, however, counteract high base wear or abrasion if there are high demands on the coating. A typically sufficient thickness for the adhesion layer can be in the range of 5-15 μm. However, thicknesses starting with 3 μm or even greater thicknesses may be possible.

The thermoplastic polymers in the top layer and the optionally present minimum of one intermediate layer may be chosen from perfluoroalkoxy copolymer (PFA), polytetrafluoroethylene (PTFE), tetrafluoroethylen/hexafluoropropylene copolymer (FEP) or mixtures of these fluoropolymers. PFA may be well suited for the production of thicker layers that contain fluorine-containing thermoplastic polymers, since it enables the best flowability and thus the production of extremely homogeneous and smooth surfaces.

The fluoropolymers are thermoplastically processable, soft, chemically resistant, and have only low forces of adhesion to polar and nonpolar surfaces. Accordingly, friction on the surface of these fluoropolymers may be also reduced. Moreover, fluoropolymers are hydrophobic and temperature resistant and therefore can be used long term at temperatures from 260 up to about 300° C. The coating even comes through short term periods of exceeding the said maximum usage temperature undamaged.

In addition, through the relatively low content of the said fluoropolymers in the top layer they can contain a high amount of high-performance thermoplastics, which can, for example, make up the amount of the top layer needed to make up 100 wt %. In this way the hardness and temperature stability may be also improved on the surface of the coating. The top layer can also contain fillers.

Therefore, the proposed coatings are advantageously suitable for coating cookware, cooking appliances and other surfaces that may come into contact with water, fats or chemicals.

Such coatings also can be advantageously used on tools to work on or process sticky and pasty substances. The coating can be applied to the surface of mechanically and thermally less stressed casting molds and it thus enables easier demolding. Lower friction is connected with the good antistick effect of the surface of the top layer, so the coating can also be used to reduce the forces of friction, such as a slip layer, which may be now for the first time enabled through the improved hardness of the coating. One possible use of the coating can also come up for mechanically less highly stressed bearings or in general surfaces that rub together. The use of the coating at such rubbing surfaces that are exposed to chemically aggressive, hot or sticky materials and liquids may also be advantageous.

Thermoplastic polymers that can be mixed into the high-performance thermoplastics in particular for the underlayer, the adhesion layer or the intermediate layer, in an amount up to about 10% by weight without significantly reducing the properties compared to using the high-performance thermoplastics alone, can be chosen from polysulfone (PSU), polyphenylene sulfide (PPS), polyphenyl ether sulfone (PPSU), polyether sulfone (PES) or polyaryl ether ketone (PAEK). Small amounts of fluorine-containing polymers may also be possible. In particular, the fluorine-containing polymers can get into deeper layers under the top layer in producing the layers, depending on the process, without unduly degrading the properties of the coating.

DETAILED DESCRIPTION

Figure 1:
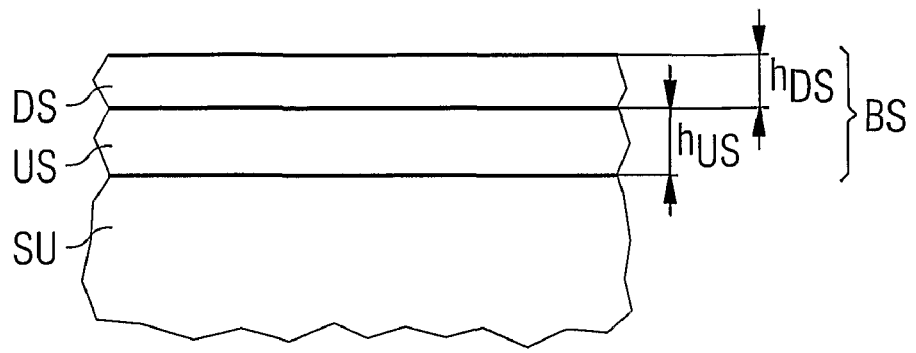
FIG. 1 shows the simplest embodiment in a schematic cross section.

FIG. 1 shows the simplest embodiment of the coating. On the surface of a substrate SU, which represents the article or a surface area thereof, an underlayer US and, on top of it, a top layer DS are situated. The substrate SU can be any material, such as glass, ceramic or metal. The thickness $h_{DS}$ of the top layer may be, for example, 20-30 μm. The thickness $h_{US}$ of the underlayer is at least 5 μm. However, the thickness of the underlayer may be matched to the achievement of a certain property or property profile that is linked with it and may be increased in correspondence with that.

The surface of the coating BS, which here comprises the top layer and the underlayer, is smooth and free of pores. The fine structure of the individual layers is homogeneous.

Figure 2:
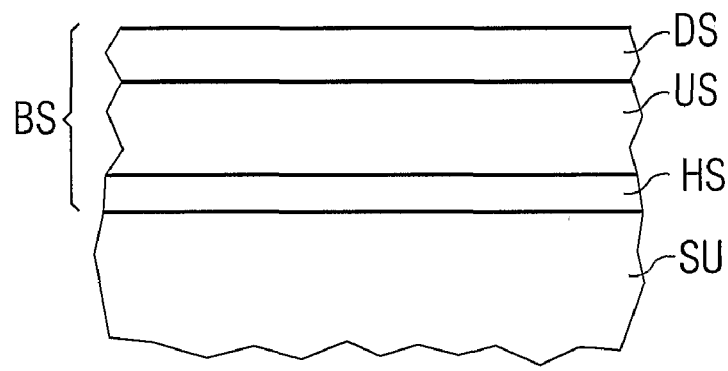
FIG. 2 shows an embodiment with an adhesion layer.

FIG. 2 shows another embodiment of an antistick coating, in which an adhesion layer HS is situated under the underlayer US directly on the surface of the substrate SU. It has a thickness of 5-20 μm, for example, and may be filled with metal particles, preferably zinc or aluminum particles, up to a maximum degree of filling by volume of 50%. The structure of underlayer US and top layer DS on top of it can be formed as in the embodiment example in FIG. 1. The coating BS in this case comprises three different layers.

Figure 3:
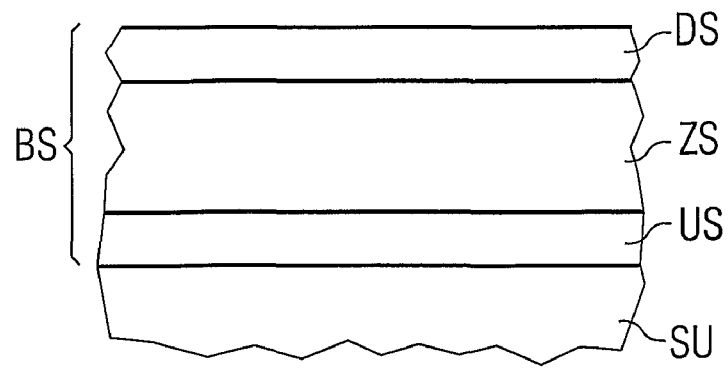
FIG. 3 shows an embodiment with an intermediate layer.

FIG. 3 shows another embodiment, in which an intermediate layer ZS is specified between the underlayer US and top layer DS. Besides the said inorganic fillers it additionally comprises a thermoplastic high-performance polymer, which can be used in pure form or in a mixture with different high-performance polymers.

A desired property, for example, a particular hardness or thermal stability, can be produced in the coating BS via the intermediate layer ZS with the help of an appropriately chosen filler. Also, the sound damping of the coating can be adjusted and improved via a suitable intermediate layer. The intermediate layer ZS may be filled, for example, with a particularly hard filler and has a thickness up to, for example, 500 μm.

An adhesion layer HS (not shown) can be provided between the underlayer US and the substrate surface SU.

By a series of schematic cross sections, FIG. 4 shows the substrate and the layers applied to it during different steps in the production of the coating.

First, the surface of the substrate SU intended for the coating, which again can be the article or a surface area thereof, is at least cleaned, but may also be pretreated. The pretreatment represented in FIG. 4A in the form of arrows can be a mechanical or chemical roughening, for example, sand blasting or treatment with acids or alkalis. Additional binding sites for better adhesion of the applied layers can be produced via the pretreated surface.

Then a mixture that can be used as coating ("coatable mixture"), which can be converted to the desired layer, may be applied to the pretreated and optionally roughened surface. The starting point for each coatable mixture is a fine powder of the thermoplastic or plastics that are intended for the relevant layer. The powders are fine, homogeneous and have a particle size distribution that is as narrow as possible. The average particle size, for example, the D50 value, may be chosen in correspondence with the desired thickness of the layer that is to be produced. The D50 value of the particle size must maximally correspond to twice the thickness of the end layer to be produced. This means that with a powder mixture having a D50 of 20 μm, for example, layer thicknesses of the end layer starting with 10 μm can be produced.

To produce finer powder mixtures of thermoplastic particles, cryogenic milling, for example, of the particles and an appropriate particle size classification may be suitable.

Also, the fillers intended for the relevant layer may be added to the thermoplastic powder ground as finely as possible and assorted according to particle size and the entire mixture is homogeneously mixed.

A coatable mixture can comprise only the powder, which is optionally additionally dried for this purpose. For another coating process a dispersion may be prepared from the homogeneous powder, which can be done by adding solvents, e.g., water-based solvents and, optionally, dispersion aids.

Correspondingly, the application of the coatable mixture can take place by powder layering or by dispersion coating. For powder coating the powder mixture may be sprayed or spread on the substrate SU. The adhesion of the particles to the substrate surface can be electrostatically supported by electrically charging the powder mixture before or during the coating operation and correspondingly grounding the substrate.

It may also be possible to heat the surface of the substrate sufficiently that the thermoplastic components of the powder soften and adhere upon hitting the surface, so that at the least a preliminary consolidation occurs.

The dispersion can also be sprayed. It is also possible to dip the article in a dispersion or to imprint, stamp, roll or brush the dispersion onto the article. A spin-on process may also be suitable.

A process for coating thermally sensitive articles or article surfaces that can also be used here is thermal spraying, in which the thermoplastic particles of the coatable powder mixture may be melted and sprayed or drizzled in a finely divided form onto the colder or even chilled surface.

Figure 4A:
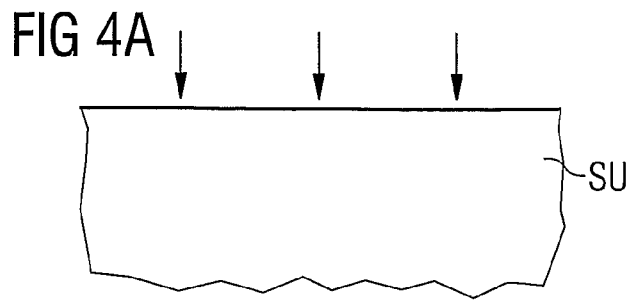
FIG. 4 shows various steps in the production of a coating for the article.
Figure 4B:
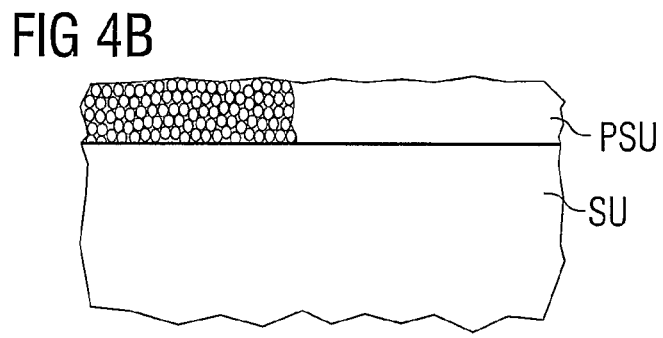

The substrate SU otherwise provided with a powder layer PSU intended for the underlayer is shown in FIG. 4B. In the next step the possibly preconsolidated powder layer may be converted to the finished consolidated layer by placing the article in an oven and bringing it up to a temperature that is above the melting point of the thermoplastic in the powder mixture that has the highest melting point. A temperature program may be carried out in the oven in order to bring about consolidation as optimal as possible and to guarantee a homogeneous and stable layer structure.

It is also possible to use a tunnel oven that has different temperature zones. The temperature program can then be carried out so that the article may be moved through the tunnel oven and into the individual temperature regions for the given time corresponding to the temperature program.

Figure 4C:
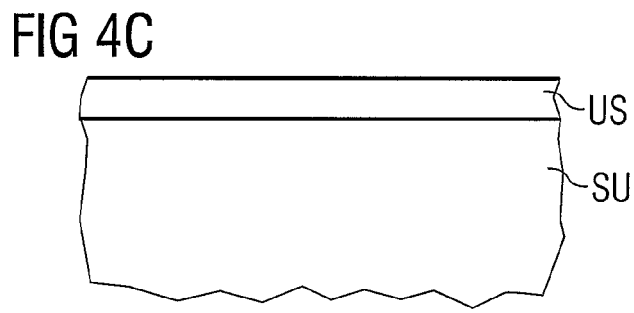

FIG. 4c shows the article or substrate SU with a completely compacted underlayer US.

Figure 4D:
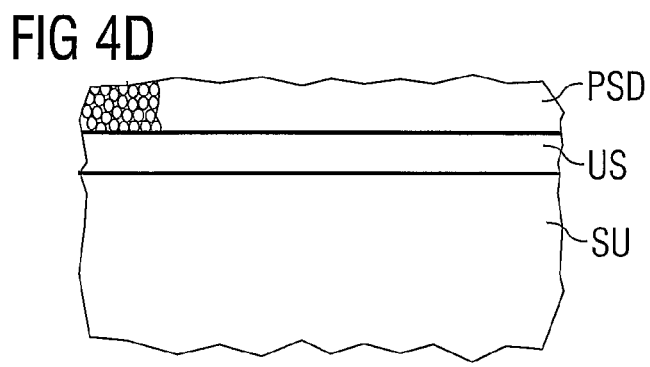
Figure 4E:
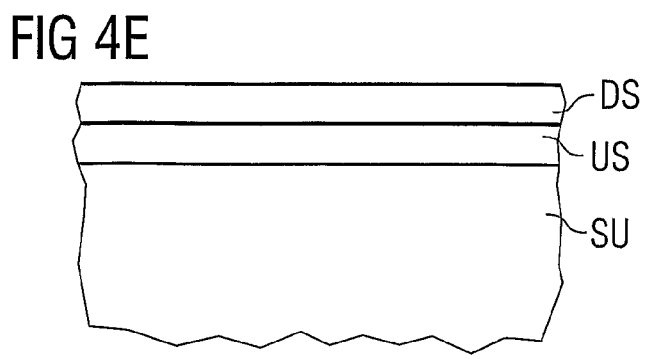

A powder layer PSD intended for the top layer may be applied in an analogous way onto the underlayer in the next step. The composition of the coatable mixture is selected in correspondence with the specified composition of the top layer. FIG. 4d shows the article with the powder layer for the top layer PSD.

In a final step, the powder layer PSD for the top layer is consolidated, which can take place by analogy with the consolidation of the underlayer US. Depending on the change in the composition of the top layer a different temperature program that is matched to the changed consolidation process for the top layer can be used.

Figure 5A:
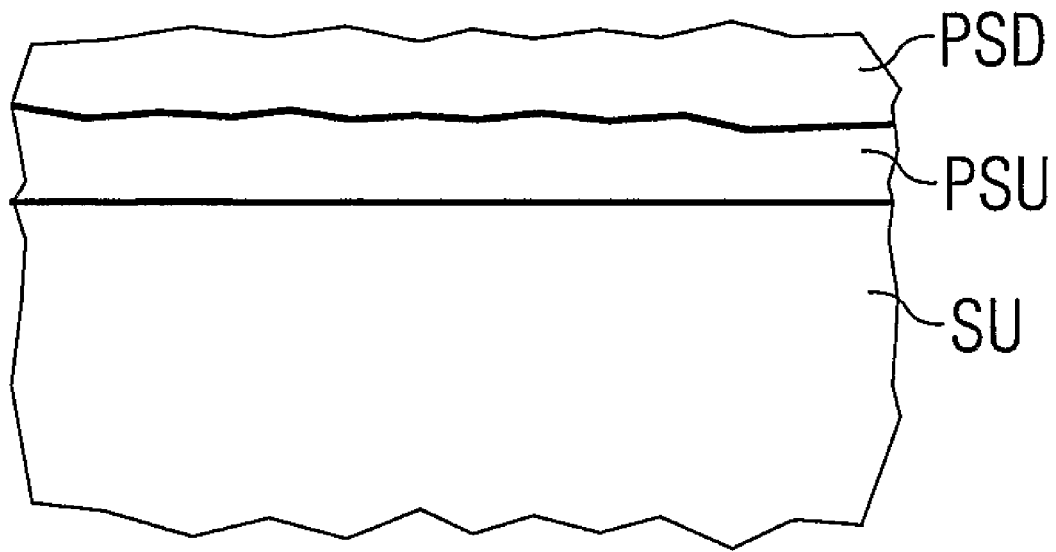
FIG. 5 shows an embodiment of the method in producing the article via different process steps.

FIG. 5 shows one embodiment of the method in which the consolidation of all of the applied powder layers takes place together in one final step. FIG. 5a shows a substrate SU that is provided with two powder layers PSU and PSD for the underlayer and top layer that are applied one on the other. At least the powder layer PSU for the underlayer can be preconsolidated, which facilitates the application of the powder layer PSD for the top layer. FIG. 5a shows the disposition of this step.

Figure 5B:
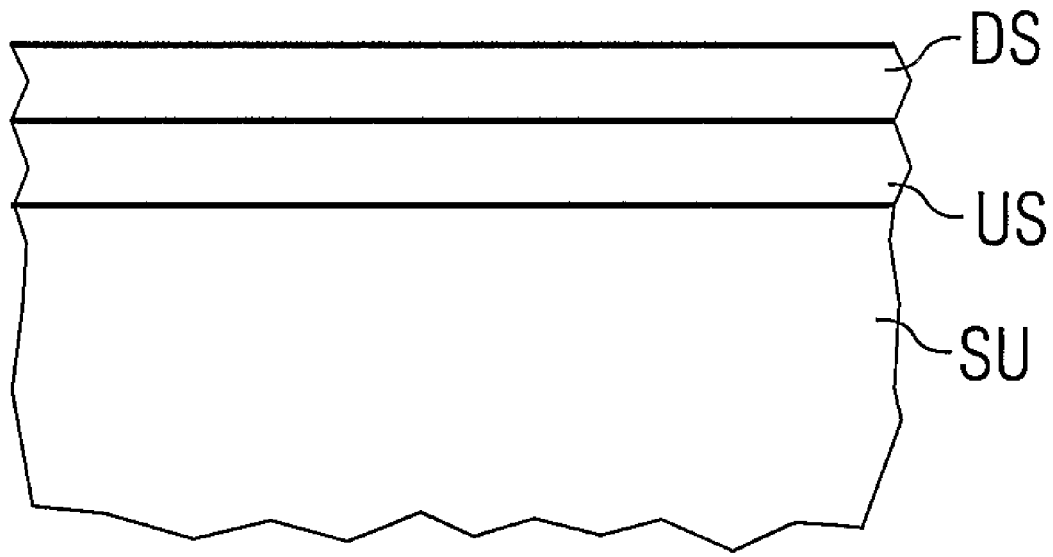

By applying an appropriate temperature program to the layer structure comprising two or more powder layers the powder layers may be jointly consolidated and the article shown in FIG. 5b is obtained with a finished coating comprising the underlayer US and the top layer DS.

For coatings that are desired to have more than two layers the method may be appropriately adjusted.

The coating can be applied to the entire surface of an article. However, it is also possible to exclude individual surface regions from the coating or to conduct the coating only in a limited area of the surface of the article. For this it is possible to use coating masks, which may be placed on the article or applied in the form of layers that can be removed later. The coating masks may be removed before the final consolidation step.

The invention claimed is:

1. An article with a coating on a surface of the article, the coating comprising:
   a top layer having a thickness of at least about 5 µm, the top layer comprising:
      one or more high-performance thermoplastics; and
      20-30% thermoplastic organic fluoropolymers by weight; and
   an underlayer between the surface of the article and the top layer, the underlayer having a thickness of at least about 5 µm, and comprising one or more high-performance thermoplastics,
      wherein the high-performance thermoplastics in the underlayer and top layer are selected from the group consisting of polyaryl ether ketones, LCP, PEK, PEEK and mixtures thereof.

2. The article of claim 1, wherein the underlayer comprises less than about 50% PEEK by weight.

3. The article claim 1, wherein the underlayer further comprises metallic particles.

4. The article of claim 1, wherein the underlayer further comprises particulate inorganic fillers, the particulate inorganic fillers being selected from the group consisting of silicate, quartz, silica, glass, mineral and ceramic particles.

5. The article of claim 4, wherein the particulate inorganic fillers in the underlayer comprise one or more of nanoparticles, fibers or lamellar particles.

6. The article of claim 4, wherein the particulate inorganic fillers comprise at most about 50% by volume of the underlayer.

7. The article of claim 1, further comprising one or more intermediate layers between the underlayer and the top layer, the one or more intermediate layers comprising:
   a thermoplastic high-performance polymer selected from the group consisting of polyaryl ether ketones, PEK, PEEK, LCP, PPS and mixtures thereof and
   an inorganic filler.

8. The article of claim 1 further comprises an adhesion layer including metallic particles between the surface of the article and the underlayer.

9. The article of claim 8, wherein the adhesion layer has a thickness of between about 5-20 µm.

10. The article claim 8, wherein the adhesion layer comprises passivated particles of non-noble metals.

11. The article of claim 8, wherein the adhesion layer comprises:
   a thermoplastic polymer selected from the group consisting of polyaryl ether ketones, PEK, PEEK, LCP, PPS and mixtures thereof, and
   40-90% metallic particles by weight.

12. The article of claim 1, wherein the thermoplastic fluoropolymers are selected from the group consisting of PFA, PTFE, hexafluoropropylene and mixtures or copolymers thereof.

13. The article of claim 1, wherein the top layer has a thickness of between about 5-30 µm.

14. The article of claim 1, wherein the article comprises a kitchen appliance, cookware, or pan.

15. The article of claim 1, wherein the top layer comprises an uppermost layer.

16. The article of claim 7, wherein the underlayer has a first layer property, and the intermediate layer has a second layer property, the second layer property being different from the first layer property, the first layer property and the second layer property selected from the group consisting of antistick, hardness, adhesion, electrical insulation, chemical stability, dielectric constant, and thermal stability.

17. The article of claim 10, wherein the non-noble metals comprises Zn or Al particles.

* * * * *

UNITED STATES PATENT AND TRADEMARK OFFICE
CERTIFICATE OF CORRECTION

PATENT NO. : 7,794,823 B2  Page 1 of 1
APPLICATION NO. : 11/815173
DATED : September 14, 2010
INVENTOR(S) : Christoph Stecher It is certified that error appears in the above-identified patent and that said Letters Patent is hereby corrected as shown below:

Title Page, Col. 2, Line 3 Item [56] – delete ""Fluorpolymere"," and insert -- "Fluoropolymer", --, therefor.

Title Page, Col. 2, Line 4 Item [56] – delete "tillers" and insert -- fillers --, therefor.

Column 7, Line 42 (Approx.) – In Claim 3, after "article" insert -- of --.

Column 8, Line 19 – In Claim 10, after "article" insert -- of --.

Signed and Sealed this

Thirtieth Day of November, 2010

David J. Kappos
*Director of the United States Patent and Trademark Office*